INVENTORS
EDUARD KÜSTERS
KURT QUOOS

3,527,668
APPARATUS FOR THE REMOVAL OF WATER
FROM CELLULOSE WEBS AND CLEANING
OF THE APPARATUS
Eduard Küsters, Gladbacher Str. 457, and Kurt Quoos,
Bismarckstr. 74, both of Krefeld, Germany
Filed Oct. 13, 1966, Ser. No. 586,518
Claims priority, application Germany, Oct. 29, 1965,
K 57,521
Int. Cl. D21f 3/04
U.S. Cl. 162—272                                    1 Claim

ABSTRACT OF THE DISCLOSURE

A cellulose web dewatering roll press having axially extending radial extensions and depressions on respective rolls which mate with each other respectively to apply pressure to the web and remove water therefrom. The rolls have circumferentially extending water drainage grooves and groove cleaning finger members in the grooves for cleaning the grooves of fiber fines.

This invention relates to a mechanism for the removal of water from cellulose and cardboard breadths or webs and similar products by means of rolls contacting each other under pressure between which rolls the material is passed.

It is already known to remove water from cellulose and cardboard breadths by means of rolls contacting each other under pressure and between which the material is passed. By increasing the pressure of the rolls against each other it is possible to improve the drainage effect. Increase in pressure until achieving an optimum drainage effect has, however, so far been subject to limitation since, with increased pressures, the material of the breadth in the roll nip will be subject to changes of length which are appreciable and which occur together with a blocking of material at the ingoing side of the rolls. This will result in displacement of the material which, according to the condition of the material, will be different at different locations and therefore results in breadth destruction.

The main object of the present invention is to arrange the water removing mechanism in such a way that it permits the use of high pressures resulting in optimum drainage effects, such as pressures in the order of 150 kg./cm., 300 kg./cm., 600 kg./cm. roll width and even more without having to fear detrimental effects on the breadth to be subject to water removal.

Essentially, this problem has been solved according to the present invention by providing, as press rolls, rolls having surface structures forming molds in effect which engage or close in the circumferential direction and which carry along the material upon its entering between the rolls due to closure of the molds which are then pressing the material together.

Due to the fact that the mechanism is provided with said rolls it is achieved that the rolls, comparable to gear pumps, carry along a seized breadth volume but do not release back said volume so that undesirable backflow blocking or obstruction together with its resulting effects occur.

It will be favorable, in this connection, to choose the peripheral length of the rolls so or approximately so that the peripheral length takes into account the lengthening of the cellulose breadth so that the lengthening of the breadth cannot result in an attempted displacement with regard to the roll circumference.

The material breadth leaving the rolls may, if so desired, be routed through a planing or flattening machine in order to restore its plane form. The mechanism designed according to the present invention even permits increased operating speeds.

Rolls of the peripheral shape as provided are known per se. They have, for instance, been suggested for mangles in order to produce a so called beetle effect. In this case it is intended by the roll shape to obtain a friction of fabric layers lying on top of each other in connection with a compression as a substitute for hammering in order to achieve a soft feel and a silky gloss of the fabric.

Similar rolls are also used in the manufacture of corrugated cardboard. In the production of this material the corrugation is produced from paper rolls previously moistened by steam by means of heated fluted rolls.

These fields of application of the rolls already known do not deal with the problem of water removal.

Provision of drainage channels and water removal bores may be important as a means promoting the desired purpose. According to the present invention, therefore, grooves in the surface of at least one of the cooperating rolls may be provided for the purpose of water removal. These grooves may be circumferentially extending drainage grooves.

Provision of water removal channels in the periphery of smooth press rolls for the pressing of wet cardboard is already known. With the high pressures to be applied in connection with the subject matter of the present invention still greater quantities of water will have to be removed. The drainage or water removal grooves, therefore, are still more important.

The cooperating rolls are preferably corrugated in the peripheral direction respectively with the corrugations of each roll extending axially with respect to the roll.

Favorably the bottom of the circumferentially extending drainage grooves is corrugated substantially like the roll surface to give an equal depth from the same.

In principle, circumferentially extending drainage grooves with the bottom lying in a circle around the roll axis would also be possible. Peripheral grooves with a corrugated bottom are, however, preferred not only due to constant depth but also due to technical reasons of production considering transition of the groove rim into the roll surface.

When processing material with which deposits of resin or similar on the rolls are likely to occur, it is recommended to provide, for each roll, a separating cloth rotating in an endless loop and placing itself between the roll and the material and having an ingoing and outgoing speed exceeding the maximum peripheral speed of the rolls.

In this case the ingoing and outgoing speed of the separating cloths favorably exceeds the maximum peripheral speed of the rolls to such an extent that the separating cloths are able to be placed into the roll corrugations without tension or substantially without tension.

Thus it is avoided that the separating cloths are subject to rapid destruction resulting from distortion between the rolls.

It will also be favorable to provide each roll with a tongue, engaging in the groove and projecting against the groove bottom, for instance, in the shape of a catch. Preferably the tongues are provided if, with the material to be processed, minor resin or similar deposits are likely to occur and therefore, for instance, the separating cloths provided for preventing such deposits may not be used. The tongues prevent the cellulose breadth from sticking to the rolls. They will be provided individually and not in the form of teeth of a comb because plastic rolls or plastic shell rolls respectively or plastic covered rolls are used in the present mechanism and the coefficient of expansion of plastic is approximately ten times the coefficient of expansion in the case of metal. With the long rolls used a structure consisting of one piece and being in the form of a comb would result in undesirable effects.

The tongues may be subject to the action of an elastic force pressing them into the grooves.

It is recommended to provide the catches with guide surfaces gliding on the corrugations of the active roll periphery. Thus it will be prevented that the ends of the catches get entangled in the groove bottoms.

It will furthermore be favorable to provide a staggered arrangement for the guide surfaces of adjacent catches in the peripheral direction of the rolls. Due to such staggered arrangement the catches are not able to obstruct each other in the case of displacement in the direction of their bearing axes.

Otherwise, apart from the staggered arrangement, the catches may project at different lengths from their bearings.

Several examples of a construction according to the present invention are shown in the accompanying drawing in which.

Figure 1:
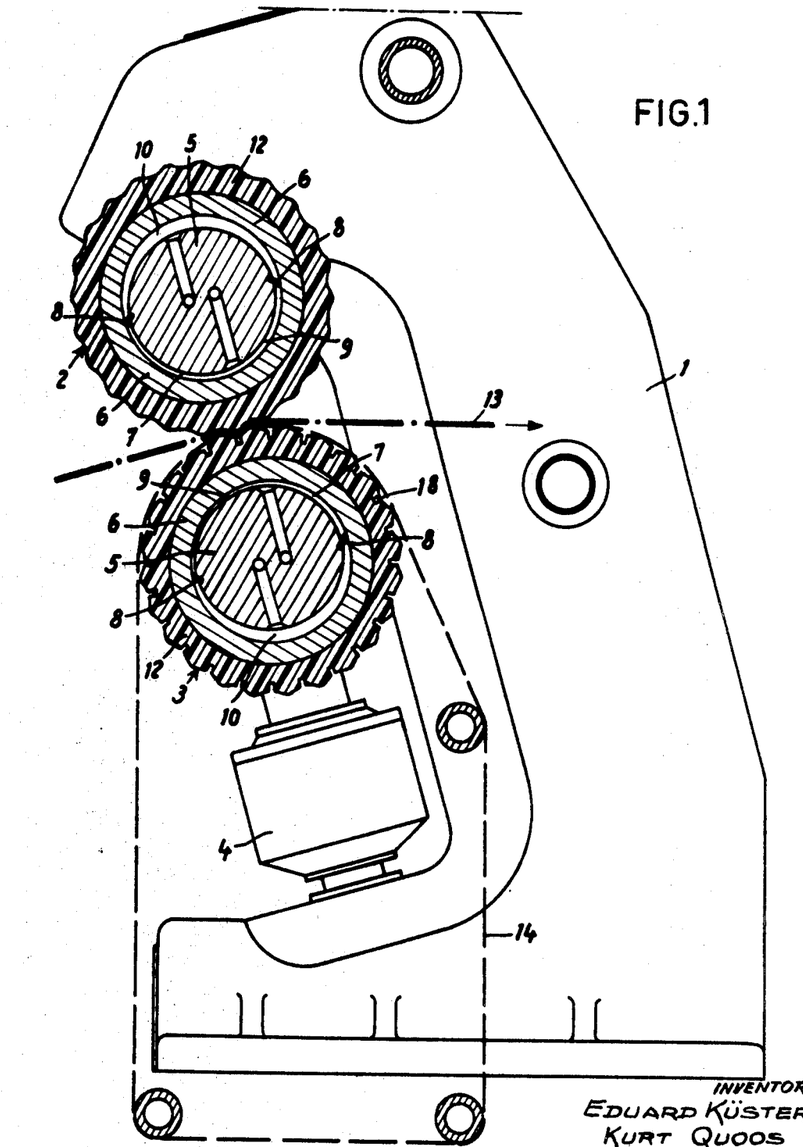
FIG. 1 is an elevational lateral view of a mechanism in the form of a roll press in which the rolls are shown in section.
Figure 2:
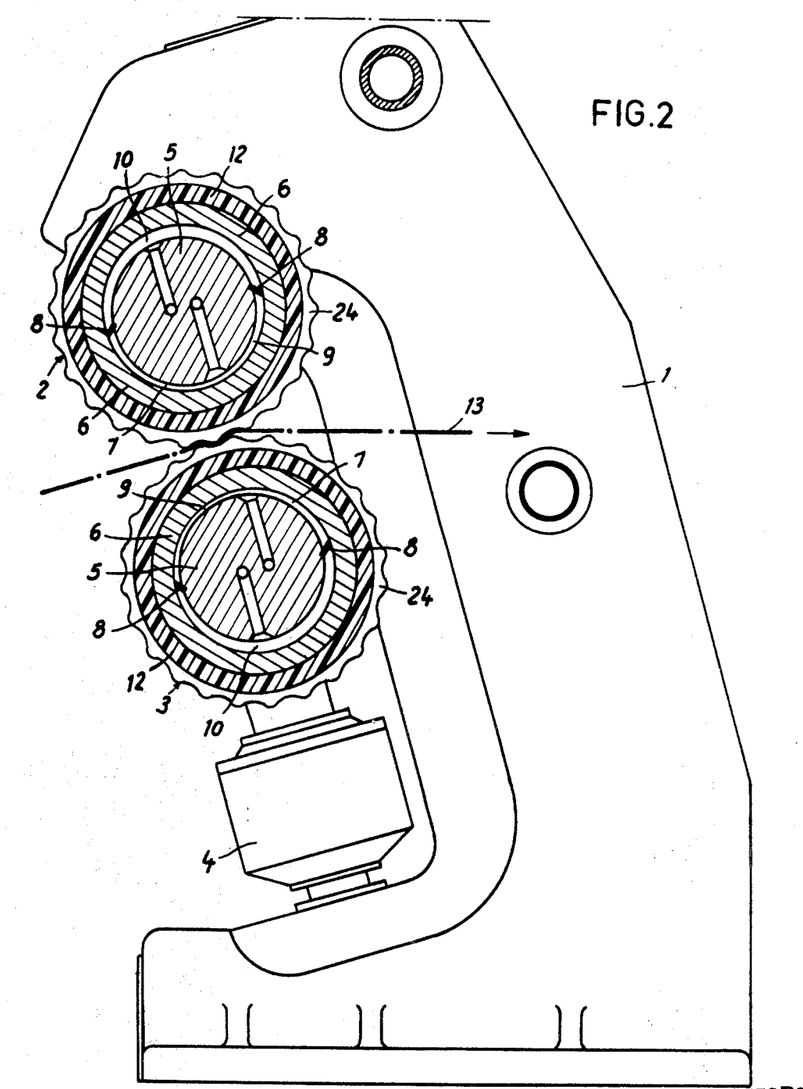
FIG. 2 is a view of a mechanism according to FIG. 1 in which the rolls are provided with peripheral or circumferential grooves.

In FIGS. 1 and 2 the frame of the roll press has been identified by 1. The rolls have been defined as 2 and 3. While 4 is the mechanism for moving the bottom roll 3 against the top roll 2.

The rolls have been designed, for instance, as controlled deflection rolls in which hydraulic pressures are applied inside the rolls and in which, for instance, a roll shell forming the active roll periphery is divided into two longitudinal chambers of which the chamber located on the operating side is connected to a pressure liquid originating from a pump. Such controlled deflection rolls have been commercially available throughout the world for a long time.

Accordingly, the rolls comprise a non-rotative shaft or core 5 which is supported at its ends, and a hollow steel cylinder or roll shell 6 intended for rotation which leaves a space 7 between the periphery of the core or shaft 5. Said distance space is subdivided into two longitudinal chambers 9 and 10 by the sealing strips 8 which are located on the shafts or cores. The longitudinal chamber 9 is located on the operating side of the roll and the longitudinal chamber 10 on the other side. A flowable pressure medium is routed into the longitudinal chamber 9 in order to press the operating roll peripheries against each other when the same are working. When the roll peripheries are to be separated the pressure medium is discharged from the chambers 9 and routed into the chamber 10.

In the example of a construction as shown, the top roll 2 is driven via the roll neck end 11 and, for this end, is designed according to the construction of driven controlled deflection rolls of commercial forms. The bottom roll is designed accordingly. However, this roll does not have a driven roll neck end. Naturally, both rolls may be driven in which case the hollow cylinders or roll shells of both rolls are provided with a driving end.

The hollow cylinders or roll shells of both rolls are each provided with a superpolyamide shell or cover 12.

The cellulose breadth from which the water is to be removed has been identified by 13.

Figure 3:
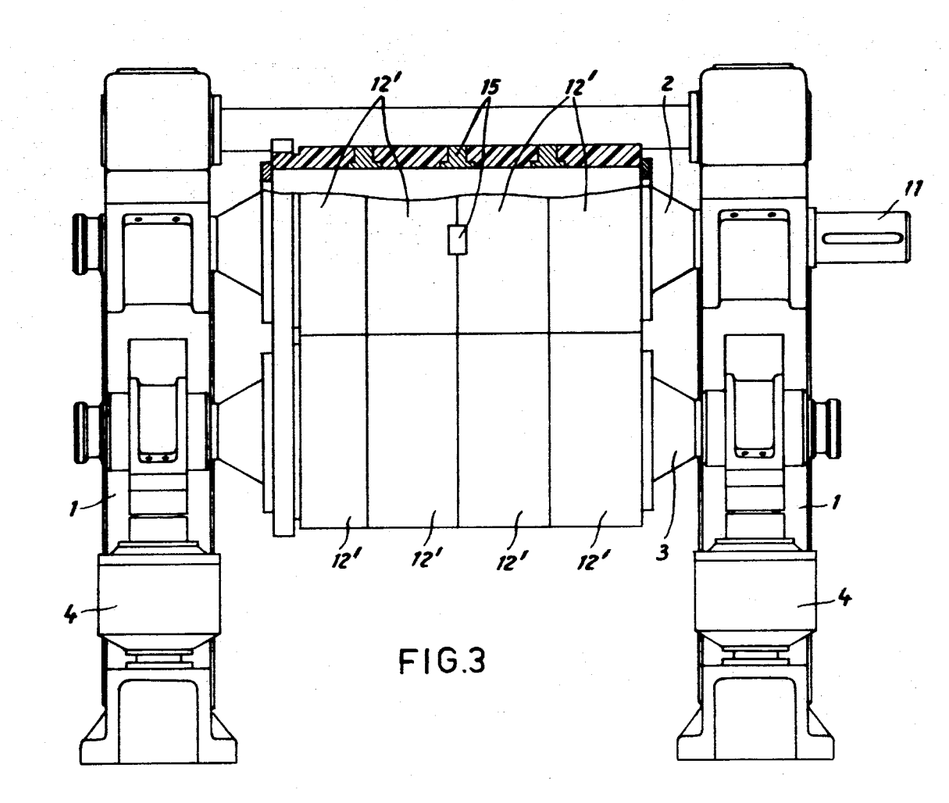
FIG. 3 is an elevational view of the mechanism as seen from the ingoing side.

As may be seen from FIG. 3, the shells 12 may be composed of individual cylinder pieces 12'. The adjacent cylinder piece ends have been secured against mutual dislocation by the anchors 15. Naturally, the shells 12 may also consist of one piece if this should become possible.

In the examples of the present invention as shown in FIGS. 1 through 13 the roll peripheries are corrugated in the peripheral direction and the crests 16 of one roll periphery engage into the troughs 17 of the other roll periphery. The corrugations have been chosen such that the rolls carry along the cellulose breadth upon introduction of the same approximately in the manner as is the case with liquid by engaging wheels of a gear pump. By means of closure of each mold the cellulose breadth cannot move back or be accumulated back to form an obstacle. The breadth is compressed between the rolls. Lengthening of the breadth occurring due to such compression is taken up by the troughs and crests of the corrugations.

Figure 9:
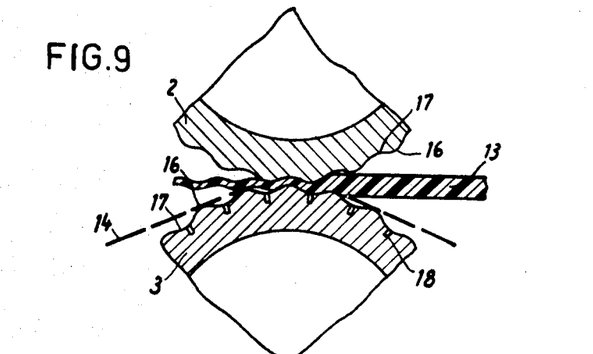
FIGS. 9 through 13 are sections of cooperating peripheral sides of the rolls of various embodiments of the present invention.
Figure 10:
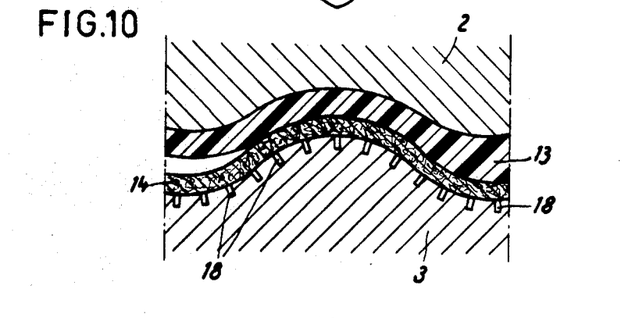

In FIGS. 1, 9 and 10 longitudinal or axially extending grooves 18 are provided in the troughs 17 of the bottom roll 3 which grooves may be comparatively narrow, in order to improve discharge of the water which is pressed out. Such grooves may be provided in both rolls. Provision of an endless felt strip 14 rotating on either side of the cellulose breadth 13 may be omitted, but such a strip has been provided, in FIG. 1, for the bottom roll only.

In many cases provision of the felt strip is not always recommendable, particularly with increased pressures. In case resin or similar deposits on the rolls are likely to occur, provision of separating cloths may be chosen as, for instance, shown in FIG. 4.

The example of a construction according to the present invention shown in FIG. 10 differs from those shown in FIGS. 1 and 9 in that the drainage grooves 18 are distributed not only in the troughs but on the entire surfaces of the corrugations. In this case it is more favorable to omit the felt strip 14. The drainage grooves may also be provided in the top roll.

Figure 11:
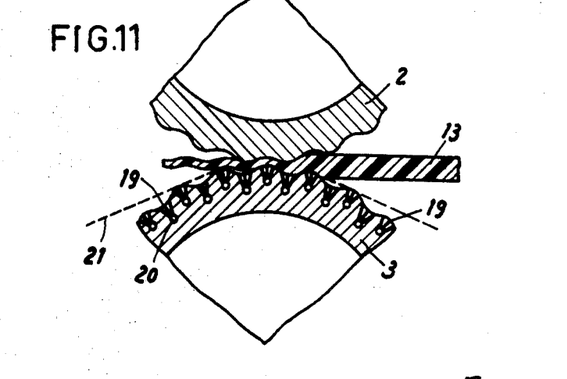

FIG. 11 is an example of a construction according to the present invention in which drainage bores 19 are provided in the bottom roll 3 which bores end, on the side not facing the working side, in channels 20 for the discharge of the water, said channels extending in an axial direction. Preferably, these channels have a cross section such that they are able to receive the entire water volume discharged through the bores 19 without essentially raising flow resistance. A cloth 21 which is endlessly rotating and consisting of comparatively wide meshes, has been guided over the bottom roll 3 which cloth is intended to prevent the entrance of cellulose particles into the drainage bores. Routing of said cloth is favorably effected similar to the separating cloth shown in FIG. 4.

Figure 12:
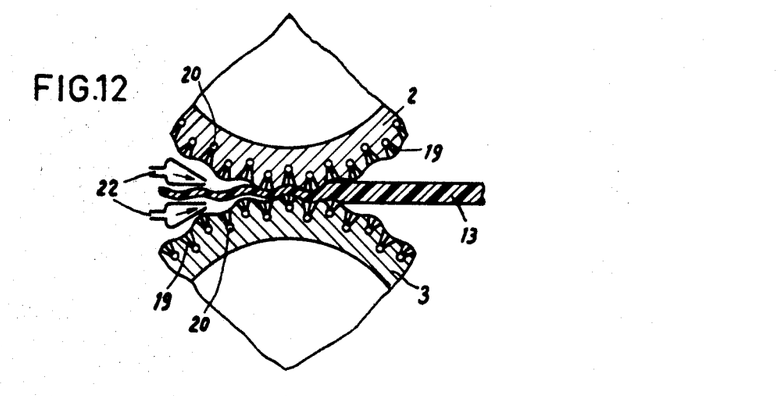

The example of a construction according to the present invention as shown in FIG. 12 provides, at either side of the breadth on the outgoing side of the material at the roll nip, nozzles 22 which are ejecting compressed air expelling water clinging to the breadth 13 into the drainage bores 19. The nozzles extend along the entire roll length in which case, if necessary, individual nozzles may be located beside each other.

Figure 13:
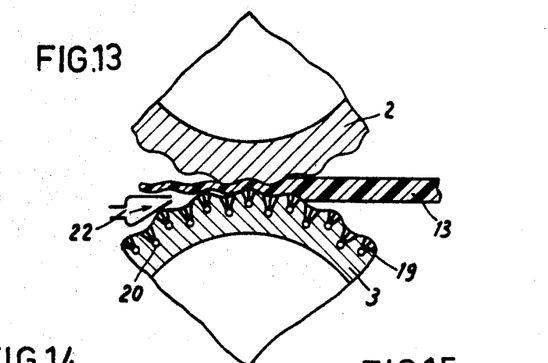

FIG. 13 is a similar embodiment of the present invention as shown in FIG. 12 in which a nozzle 22 is provided at the bottom side of the breadth only.

Figure 14:
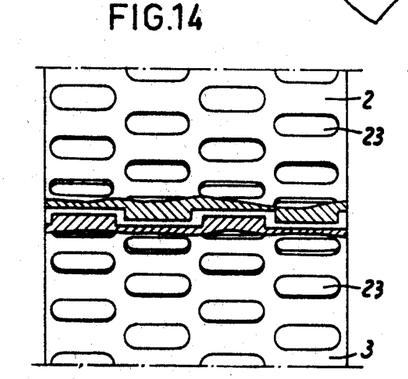
FIGS. 14 and 15 are a longitudinal section of two cooperating roll peripheries of modified embodiments of the present invention.

In FIG. 14 profiling of the peripheries of the cooperating rolls has been effected so that the peripheries of the rolls 2 and 3 have longitudinal projections 23 in which case the projections of one roll are staggered with respect to the projections of the other roll such that the projections of one roll engage into the spaces between the projections of the other roll.

Figure 15:
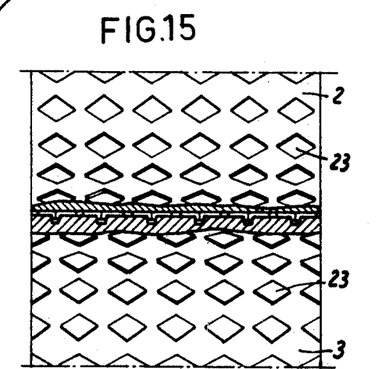

According to FIG. 15 the projections 23 are diamond shaped.

In the embodiments of the present invention according to FIGS. 14 and 15 it will also be possible to provide drainage grooves or drainage bores similar to the arrangement shown in FIGS. 12 and 13 as well as nozzles.

Still other forms (not shown) of the roll surfaces are also possible. For instance, the rolls may have cavities like spherical caps in the periphery which cavities cooperate with projections of a corresponding shape. However, rolls with corrugated peripheries are preferred. The present invention relates, in the first instance, to the latter.

FIG. 2 is an embodiment of the present invention in which peripheral or circumferential grooves in the top roll 2 and in the bottom roll 3 are provided as drainage grooves.

Figure 4:
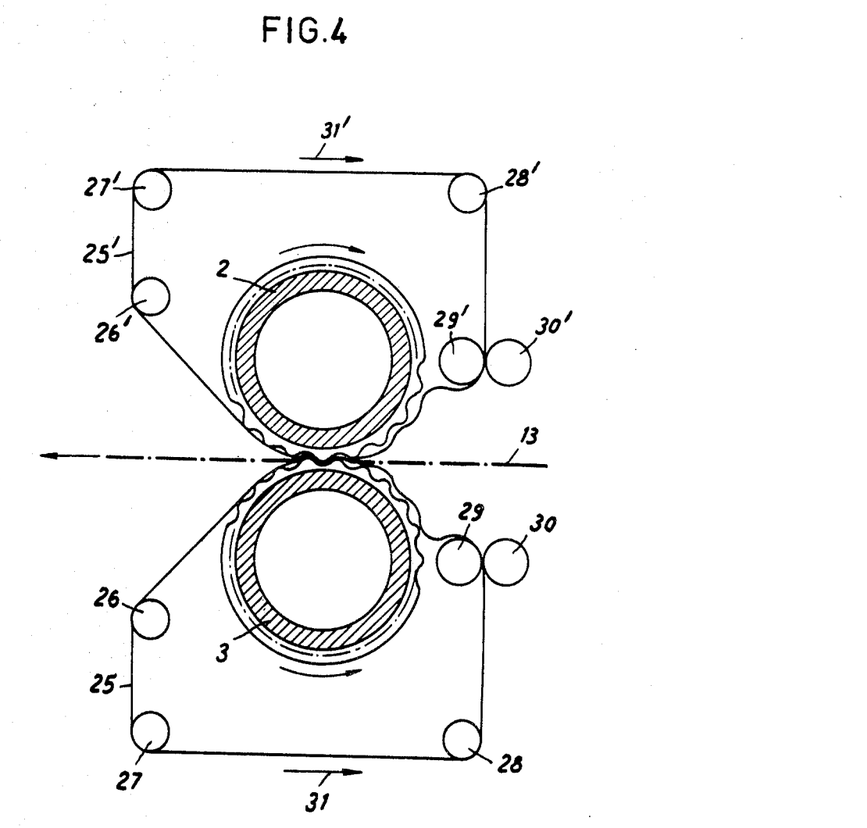
FIG. 4 is a diagrammatic view of the arrangement of the separating cloths.
Figure 5:
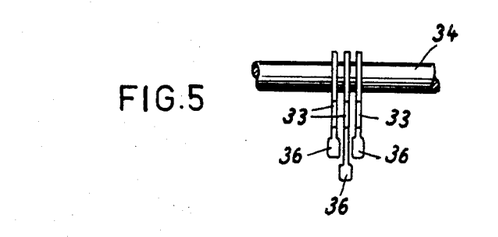
FIG. 5 is a top view of the arrangement of the catches engaging into the peripheral grooves of the rolls.
Figure 6:
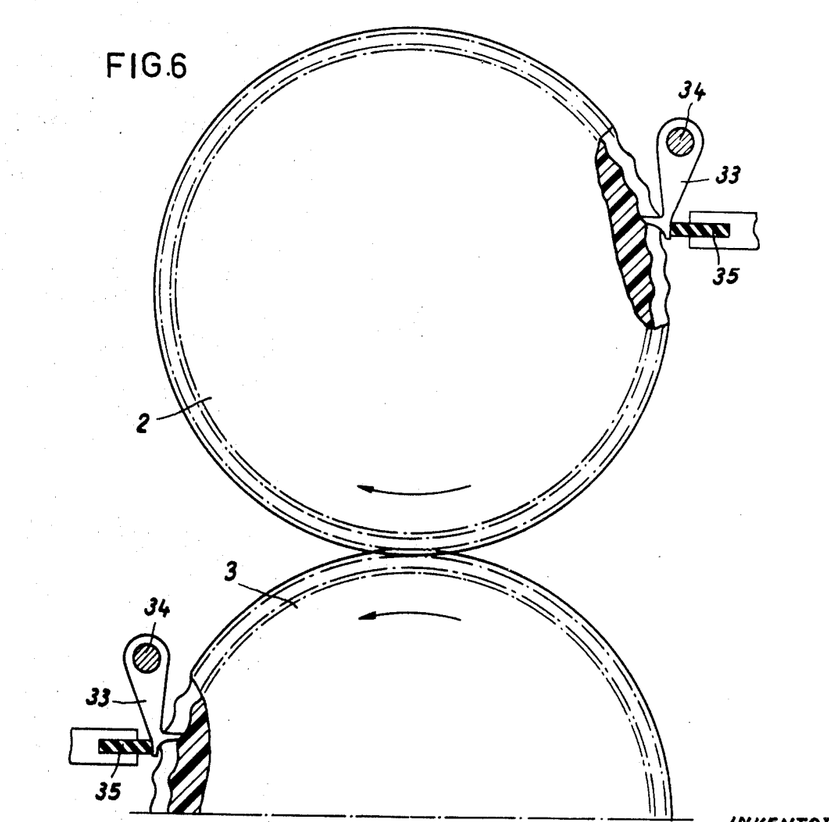
FIG. 6 is an elevational view of a pair of rolls provided with catches.
Figure 7:
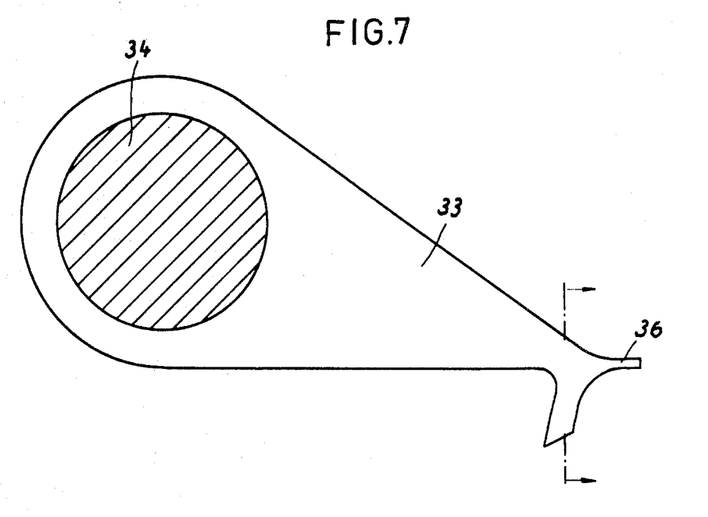
FIG. 7 is a lateral view of a catch.
Figure 8:
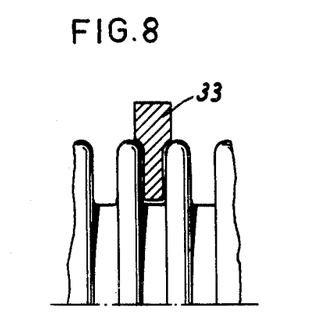
FIG. 8 is a section through a catch part engaging into a peripheral groove.

In case it is likely that the breadth to be subject to water removal will give rise to resin or similar deposits, it is recommended to choose an arrangement the principle of which has been shown in FIG. 4.

Each of the rolls 2 and 3 in FIG. 4 has a separating cloth 25 or 25' respectively which is rotating in an endless loop placing itself between the roll and the cellulose breadth 13 and which is guided via the rollers 26, 27, 28 or 26', 27', 28' respectively and driven by the pairs of rolls 29, 30 or 29', 30' respectively.

The direction of rotation of the separating cloths has been indicated by the arrows 31 whereas the direction of rotation of the rolls has been indicated by the arrows 32. The separating cloths may consist of elastic durable synthetic fibers. The separating cloths are rotating at a speed which is greater than the maximum peripheral speed of the corrugation crests. The rotating speed of the separating cloths or their ingoing speed into the rolls and outgoing speed out of the rolls respectively is greater than the maximum peripheral speed of the rolls to such an extent that the separating cloths will be placed into the roll corrugations without tension or substantially without tension.

If water is to be removed from cellulose or cardboard breadths with which any resin or similar deposits are not likely to occur, there will be no need for separating cloths. If water will be removed from such material by means of rolls provided with peripheral grooves, tongues engaging into said peripheral grooves will be provided, as shown in FIGS. 5 through 8, which tongues project against the groove bottom and are in the form of catches 33. In the case of each roll the catches are positioned on a shaft 34 so that they are swinging and axially adjustable. They are subject to an elastic pressure exerted, for instance, by a rubber stop 35, a leaf spring or the like, preferably with flat spring characteristics. The catches are provided with guide surfaces 36 by means of which they are gliding on the corrugation of the roll periphery so that the catch is able to swing in accordance with the corrugation while it is not able to get entangled in the groove bottom which will be important especially if the rolls consist of a plastic sleeve having an interior support, for instance, in the form of a steel roll having an outside diameter which is less than the inside diameter of the plastic sleeve so that the latter is loose on the steel roll. The adjacent catches are projecting from the supporting shaft 34 at different lengths as may be seen from FIG. 5 so that the catches, in the case of displacement in axial direction of the shaft 34, are not mutually obstructing each other in their effect. The end of the catch engaging into a groove has a shape according to that of the groove (cf. FIG. 8).

What we claim is:

1. In a mechanism for the removal of water from water impregnated cellulose webs and including rolls forming a nip between which the web passes, and means capable of forcing these rolls together on the web to give a nip pressure great enough to normally change the web length in the nip to a degree resulting in destruction of the web; wherein the improvement comprises said rolls having axially extending male and female radial extensions and depressions respectively which mate with each other with a uniform separation distance filled by the web as the rolls rotate to form molds at the nip of the rolls applying substantially uniform water removal pressure to the web while carrying the web forward to prevent said destruction of the web, at least one of said rolls having circumferentially extending water drainage grooves whose bottoms are all spaced the same distance below the rolls' working surface and groove clearing fingers inserted in said grooves and which are individually movable radially with respect to the roll, means for elastically biasing said fingers into said grooves, each finger having a follower riding on the working surface of the roll free from said nip and spacing the tip of the finger from the bottom of the groove in which it is inserted.

References Cited

UNITED STATES PATENTS

| | | | |
|---|---|---|---|
| 2,834,809 | 5/1958 | Schutte et al. | 162—117 |
| 2,890,540 | 6/1959 | Britt | 162—117 X |
| 3,035,497 | 5/1962 | Whitehead et al. | 162—111 X |
| 3,047,454 | 7/1962 | Marcalus | 162—117 |
| 3,323,983 | 6/1967 | Palmer et al. | 162—113 X |
| 1,517,036 | 11/1924 | Wagner. | |
| 1,938,444 | 12/1933 | Vedder | 162—358 |
| 2,714,340 | 8/1955 | Brown | 162—117 X |
| 3,198,694 | 8/1965 | Justus | 162—358 |
| 3,217,387 | 11/1965 | Strindlund | 162—362 X |
| 3,262,840 | 7/1966 | Hervey | 162—358 X |
| 3,364,103 | 1/1968 | Kusters | 162—358 |

FOREIGN PATENTS

| | | |
|---|---|---|
| 1,080,068 | 4/1960 | Germany. |

S. LEON BASHORE, Primary Examiner

U.S. Cl. X.R.

162—117, 113, 358, 362; 29—121; 100—121; 156—585; 264—286